United States Patent [19]

Gorndt

[11] 4,121,861
[45] Oct. 24, 1978

[54] FLEXIBLE SEALING JOINT

[75] Inventor: John H. Gorndt, Erie, Pa.

[73] Assignee: Lord Corporation, Erie, Pa.

[21] Appl. No.: 792,431

[22] Filed: Apr. 29, 1977

[51] Int. Cl.² ............................................. F16L 27/10
[52] U.S. Cl. .................................... 285/223; 285/263
[58] Field of Search ............... 285/261, 167, 223, 263, 285/231, 232, 234, 49, 51, 179, 266; 267/152

[56] References Cited

U.S. PATENT DOCUMENTS

| | | | |
|---|---|---|---|
| 3,390,899 | 7/1968 | Herbert et al. | 285/231 X |
| 3,679,197 | 7/1972 | Schmidt | 267/152 |
| 3,680,895 | 8/1972 | Herbert et al. | 285/167 |
| 3,734,546 | 5/1973 | Herbert et al. | 285/54 X |
| 3,853,337 | 12/1974 | Herbert et al. | 285/234 X |
| 4,068,868 | 1/1978 | Ohrt | 285/223 X |

Primary Examiner—Werner H. Schroeder
Assistant Examiner—Carl J. Arbes
Attorney, Agent, or Firm—Maurice R. Salada

[57] ABSTRACT

A flexible joint assembly for interconnecting two conduits that transport fluid under pressure includes an annular housing and a tubular member of smaller diameter than the housing. The housing has adjacent each end an annular flange that extends radially inwardly relative to the housing. Disposed between the flanges of the housing is an annular flange which extends radially outwardly adjacent one end of the tubular member. The other end of the tubular member projects through an opening at one end of the housing for attachment to a fluid conduit. Within the housing and encircling the tubular member is a rigid annulus. On each side of the rigid annulus is an annular flexible element that encircles the tubular member and includes at least one body of elastomer. The flexible elements are joined to the rigid annulus and to adjacent flanges of the tubular member and the housing so as to define a fluid-tight seal and load bearing connection between the tubular member and the housing. Each flexible element has a pair of opposed end surfaces which, when viewed in radial section, have arcuate shapes. The end surfaces of the flexible element located between the rigid annulus and the adjacent flange of the housing are curved in a direction opposite from and about different points than the end surfaces of the flexible element located between the rigid annulus and the flange of the tubular member. The oppositely curved surfaces of the flexible elements permit the joint assembly to accommodate relative tilting motions between two conduits with a relatively small and stable structure.

9 Claims, 5 Drawing Figures

FLEXIBLE SEALING JOINT

BACKGROUND OF THE INVENTION

In recent years, the world demand for fuels of all types has greatly expanded. In order to find additional supplies of such fuels as oil and natural gas, it has been increasingly necessary to turn to subsea exploration. As exploration for oil and gas moved into coastal waters, the initial attempts to drill oil and gas wells at subsea locations utilized adaptations of conventional land based drilling techniques. Thus, for example, before drilling began, a stable drilling platform was generally established by mounting the platform on legs that extended down to the ocean floor. Nonetheless, as the search for deposits of petroleum and natural gas has extended into deeper waters farther from shore, it has become necessary to abandon fixed drilling platforms and to turn to floating platforms or barges from which to conduct drilling. In some instances, floating platforms have also been used to mount equipment for pumping oil or natural gas from a producing well.

A floating drilling platform, barge, or other structure is particularly susceptible to movements in response to wave action, even though the platform or barge may be anchored. Drilling or pumping operations that are conducted from a floating platform must accommodate both lateral and vertical movements of the platform. Accordingly, drilling strings, riser lines, and similar conduits which extend downwardly from a drilling platform to the ocean floor must be capable of bending sufficiently to avoid rupturing when the drilling platform moves slightly from its designated location. Typically, the pipe that is used in a drilling string, for example, is of a sufficiently small diameter and has sufficient strength to be flexible enough to avoid damage when an associated drilling platform moves laterally or vertically. A riser line or marine conductor pipe, on the other hand, has a relatively large diameter and, therefore, a greater rigidity than a drill string. As a result, large diameter riser pipes or pumping lines must typically include at least one coupling or joint assembly that can be readily flexed to accommodate bending motion yet can provide a seal adequate to withstand high internal and external fluid pressures.

One type of flexible joint used in riser pipes consists of a ball member having a precisely machined spherical surface and a socket member having a complementary spherical surface. The joint is flexed by sliding one of the spherical surfaces relative to the other. Resilient O-rings help seal the joint at the interface between the sliding surfaces. The flexural movement of such a ball joint is impaired, however, when the joint is subjected to high pressures. The joint is also subject to frictional wear and deterioration of both the sliding surfaces and the O-ring seals. The frictional wear requires frequent repair or replacement of the joint.

Another type of flexible joint for fluid conduits, such as marine riser pipes, utilizes annular flexible elements disposed between flanges secured to adjacent ends of different sections of conduit. The flexible elements generally comprise alternating layers of a nonextensible material and a resilient material, which are normally metal and an elastomer. The layers or laminations may be annular with flat surfaces, as in the pipe joint of Johnson U.S. Pat. No. 3,168,334, or annular with spherical surfaces, as in the flexible joint of Herbert et al U.S. Pat. No. 3,680,895. Laminated flexible elements permit the necessary flexural movements of a joint and can also function as seals. A joint incorporating a laminated element has no "moving" parts and is not subject to the frictional wear encountered with the ball-and-socket joints discussed above. Other flexible pipe joints utilizing laminated flexible elements are described and illustrated in Herbert et al U.S. Pat. Nos. 3,390,899, 3,734,546, and 3,853,337.

A laminated flexible element, such as the elements described above, accommodates motion, including relative pivotal or cocking motion between adjacent lengths of conduit, through torsional shearing of the elastomer or other resilient material within the element. Any flexible element that relies on shearing of elastomer to accommodate motion is limited in its motion accommodation by the height or thickness of the elastomer that is being sheared. At any given time, a body of elastomer can be strained in shear 300% or more without adverse effects. Thus, one end of a body of elastomer that is 2 inches thick can be moved 6 inches or more relative and parallel to the other end of the elastomeric body without rupture or other failure of the elastomer. Nonetheless, if the body of elastomer were cycled through a multiplicity of shear loadings, the continued application and release of a strain on the order of 300% would shortly result in fatigue failure of the elastomer. In situations, such as a coupling for a marine riser, in which the elastomer of a flexible element will be subjected to millions of cycles of shear loading, it is desirable to limit the maximum strain on the elastomer to low levels, a typical range of maximum strains being 25–35%. The precise value or range of values for the maximum strain in a given situation will depend upon the duty cycle for the flexible element (i.e., the various sizes of motion to be accommodated and the frequency of each size) and upon the fatigue characteristics for the particular elastomeric material used in the flexible element. Consequently, in order to avoid detrimental increases in maximum strain and resultant decreases in fatigue life, the height or thickness of a body of elastomer must be increased if it is to accommodate increased motion.

Although the accommodation of torsional motion through shearing of the elastomer in a laminated flexible element does not follow precisely the same principles as the accommodation of translational motion through elastomer shearing, it is generally true that increases in the height or thickness of a body of elastomer will permit the elastomer to accept a greater degree of torsional motion. The ability to permit pivotal or torsional movements on the order of 10° to 15° in any direction from a neutral axis is an important characteristic of a flexible joint assembly for a marine riser pipe, for example. Thus, it is not surprising to see a flexible pipe joint assembly that incorporates a relatively thick or tall laminated elastomeric element, such as is shown in FIG. 10 on page 6 of ASME paper 76-Pet-68. The pipe joint, which was discussed in an oral presentation given during the week of Sept. 19–24, 1976 in Mexico City, Mexico, is also being offered for sale by Oil States Rubber Company of Arlington, Tex. Despite its apparent value in a flexible pipe joint assembly, the use of a relatively tall or thick laminated elastomeric body to accommodate large pivotal motions has significant drawbacks. First, as is indicated in Schmidt U.S. Pat. No. 3,679,197, the effective spring rate of an element of rubber at any distance from a point about which pivotal motion occurs is proportional to the spring rate of the elastomer in translational shear multiplied by the square of the distance from the pivot point. Thus, for a laminated elastomeric element in which the elastomeric layers are concentrically arranged, the contribution of the radially outer elastomeric layers or laminations of the element to the total rotational stiffness of the element is considerably greater than the contribution of the radially inner layers or laminations. Since the inner elastomeric laminations are effectively much softer in rotational shear than the outer elastomeric laminations, the major portion of the torsional strain or deflection will occur in the radially inner laminations. Consequently, doubling the height or thickness of the elastomer utilized in a laminated element that is used to facilitate rotational movement will not double the motion accommodation of the flexible element for any given maximum strain. Instead, doubling the height may increase the rotational motion accommodation capability by as little as 25%. Increasing the height or thickness of a body of elastomer in order to accommodate additional rotational motion is feasible, therefore, but inefficient.

Another problem associated with increasing the height or thickness of a laminated elastomeric element is that the element becomes unstable and tends to tilt or buckle, as is described in Peterson U.S. Pat. No. 3,292,711, particularly at column 2, lines 6 to 46. Still a third problem associated with using a relatively thick or tall laminated elastomeric element is that flexing of the element to provide rotational motion accommodation may leave substantial portions of each lamination unsupported. As a result, a compression load, for example, may be applied to a portion of a laminated element without that portion of the element being adequately supported by an appropriately rigid supporting structure. The unsupported loading of the laminations in the element, particularly the non-extensible laminations, will cause bending and, ultimately, failure of the non-extensible laminations. Failure of the nonextensible laminations effectively means failure of the flexible element as a whole.

The buckling problem that is mentioned above can be overcome to some extent by interposing within the length or height of the laminated flexible element, at one or more locations, an extra thick and rigid lamination or shim. This technique has been suggested in French Pat. No. 934,336, particularly at FIG. 6, and in Irwin U.S. Pat. No. 3,504,902, particularly at column 3, lines 56–68. The use of such an extra thick and rigid shim to overcome the buckling problem might also help to overcome the problems associated with unsupported portions of the nonextensible laminations in the flexible element.

SUMMARY OF THE INVENTION

The present invention is directed to a flexible joint assembly for interconnecting fluid conduits which provides a high pressure dynamic seal and facilitates the accommodation of tilting movements between the conduits. The tilting movement accommodation is accomplished through the use of flexible elastomeric elements, but without using a single flexible element of excessive height or length. According to the invention, the joint assembly comprises a hollow annular housing and a tubular member of smaller external diameter than the maximum internal diameter of the housing. The housing has an opening at each end and includes a pair of annular flanges that extend radially inwardly relative to the maximum internal diameter of the housing. The two flanges are spaced apart along the longitudinal axis of the housing. Adjacent one end of the tubular member is an annular flange that extends radially outwardly of the member and is located between the two flanges of the housing. The other end of the tubular member projects through the opening at one end of the housing for attachment to a fluid conduit. Within the housing and encircling the tubular member is a rigid annulus that is disposed between the flange of the tubular member and the housing flange adjacent the end of the housing through which the tubular member projects. A pair of annular flexible elements also encircle the tubular member and are disposed one on each side of the rigid annulus. One flexible element is thus located between the rigid annulus and the flange of the tubular member, while the other flexible element is disposed between the rigid annulus and the flange of the housing adjacent the end of the housing through which the tubular member projects. Each flexible element includes at least one body of elastomer and has a pair of annular exposed side surfaces. Together, the two flexible elements and the rigid annulus define at least part of a fluid tight seal and load bearing connection between the tubular member and the housing.

The benefits of the present invention are obtained through the configurations and arrangement of the two flexible elements, particularly the contours of the end surfaces of the elements. The end surfaces extend from one side surface to the other side surface of each element. Each end surface, when viewed in radial section, is defined by an arc generated about a point located generally along the longitudinal axis of the housing. The end surfaces of the flexible element closest to the end of the housing through which the tubular member projects are defined by arcs which are generated about points disposed relative to the flexible element in a direction toward the opposite end of the housing. The end surfaces of the other flexible element are defined by arcs which are generated about points disposed relative to the element in a direction toward the end of the housing through which the tubular member projects. The two sets of points about which the arcuate end surfaces of the flexible elements are generated are not located together. Instead, the arc generating points associated with the flexible element located closest to the end of the housing through which the tubular member projects are disposed farther from that end of the housing than are the arc generating points for the other flexible element. The result of having two separate flexible elements with spaced apart centers of curvature or rotation is to permit relatively large pivotal motion in a minimum of space and with a minimum of strain in the elastomer.

The flexible joint assembly of the present invention offers advantages over similar joint assemblies that utilize a single tall or thick body of elastomer, whether laminated or unlaminated, to accommodate a given degree of pivotal movement between two adjacent lengths of fluid conduit. The use of two distinct flexible elements arranged in series between the tubular member and the housing of the present invention permits each flexible element to accommodate approximately half of the total pivotal motion experienced by the joint assembly. Each flexible element thus need not be as tall or thick as a single element that must accept all of the pivotal motion. The laminations of elastomer in the two flexible elements may also be placed closer to their respective centers of rotation so as to get more effective utilization of the elastomer in terms of relative strains throughout the length or height of the element. Offsetting the points about which the arcuate end surfaces of the respective flexible elements are generated, which effectively offsets the centers of rotation of the elements, permits the flexible elements to be arranged in the housing without utilizing as much space as would be required if the two flexible elements had concentric end surfaces. Interposing a relatively massive, rigid annulus between the two flexible elements offers support to the nonextensible shims or laminations that may be used in the flexible elements and thereby helps to prevent or minimize detrimental bending of such laminations.

In one embodiment of the invention, each flexible element includes a plurality of spaced apart, annular shims of substantially inextensible material embedded in the body of elastomer. The shims improve the compression load carrying capabilities of the elastomer in each flexible element. To complement the arcuate end surfaces of the flexible elements, each shim, when viewed in radial section, has surfaces defined by arcs generated about points located at least adjacent to the points about which are generated the arcs that define the end surfaces of the flexible element incorporating the body of elastomer in which the shim is embedded. Preferably, all of the arcs in question are circular arcs and all of the points about which are generated the arcs associated with each flexible element are concentric. The flange of the tubular member may also be dimensioned and located so as to be engageable with the flange of the housing that is farther from the end of the housing through which the tubular member projects. As a result, axial movement of the tubular member toward the other end of the housing can be limited by the contact between the flange of the tubular member and the housing flange. In one construction, the rigid annulus may be formed in two sealingly engageable, annular sections. Such a construction permits each flexible element to be fabricated individually and bonded to one section of the rigid annulus. During assembly of the joint, the two flexible elements, with their associated sections of the rigid annulus, can be fitted together to form an integral unit.

BRIEF DESCRIPTION OF THE DRAWINGS

For a better understanding of the invention, reference may be made to the following description of an exemplary embodiment, taken in conjunction with the figures of the accompanying drawings, in which.

DESCRIPTION OF EMBODIMENT

Figure 1:
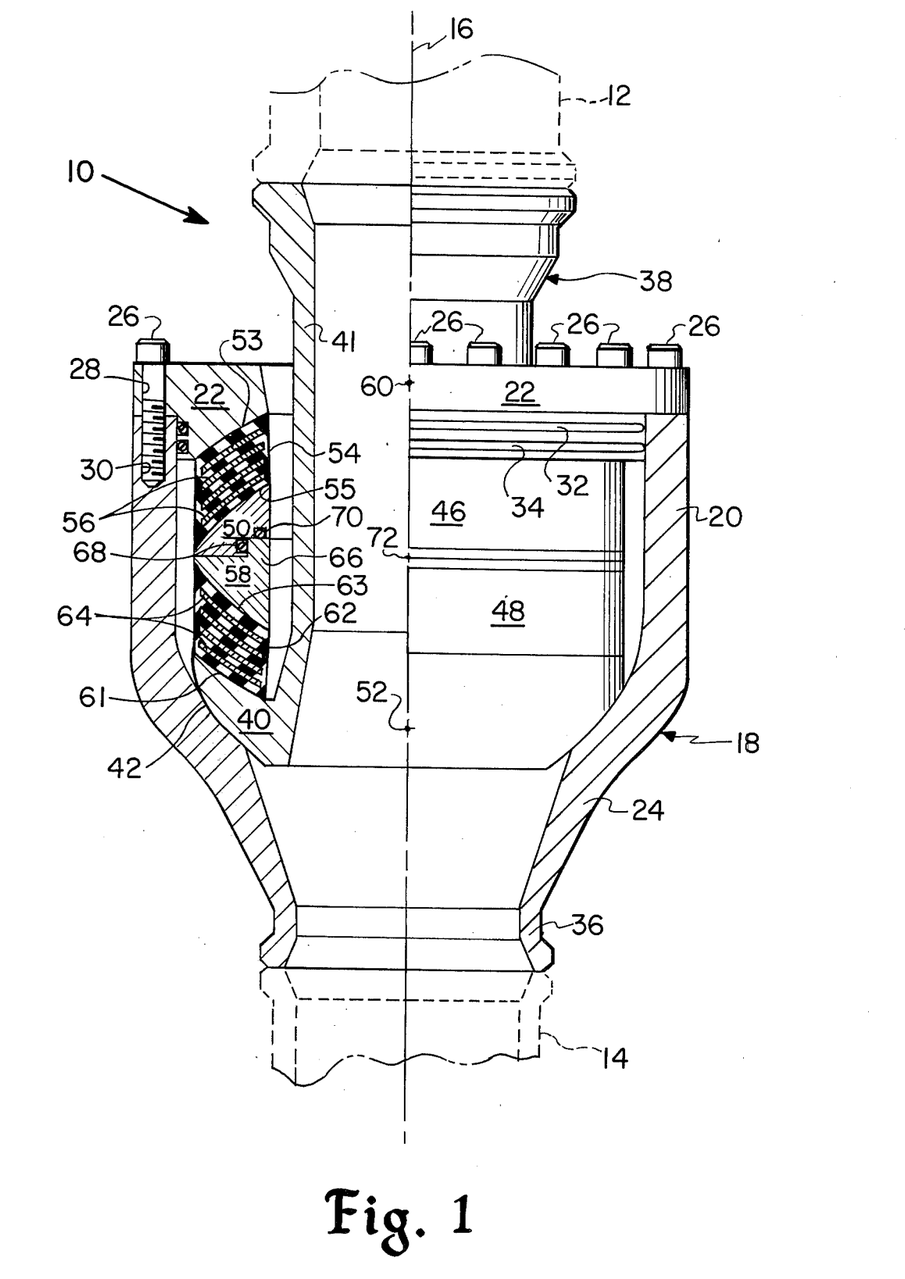
FIG. 1 is a longitudinal view, partly in section, of a flexible joint assembly according to the present invention.

FIG. 1 of the drawings illustrates, partly in section, a flexible pipe joint assembly 10. At each end, the pipe joint assembly 10 is connected to a length of fluid conduit 12 or 14 (shown in phantom). The connections to the lengths of conduit 12 and 14 are such as to provide fluid-tight seals. The connections may be achieved by any one of a number of conventional methods, such as: bolts passing through adjacent flanges formed on the joint assembly and the conduit lengths; external clamping members that engage adjacent flanges of the joint assembly and the conduit lengths; and welding of the adjacent flanges of the conduit lengths and the joint assembly. The conduit lengths 12 and 14 are suitably constructed to conduct a fluid, such as oil, natural gas, drilling "mud," or water, without leakage. In use, the joint assembly 10 and the conduit lengths 12 and 14 are also immersed in a fluid, generally water, but perhaps just air, which exerts a pressure on the exteriors of the joint assembly and the lengths of conduit. The ambient pressure thus exerted is generally different from the pressure exerted by the fluid being conducted through the conduits 12 and 14. As will be explained, the joint assembly 10 is constructed to provide between the conduit lengths 12 and 14 a fluid-tight connection that is capable of withstanding the difference between the external ambient pressure and the pressure of the fluid in the conduits. The joint assembly 10 also permits pivoting movements of the conduits 12 and 14 relative to each other about axes transverse to the longitudinal axis 16 of the joint assembly.

The joint assembly 10 includes a hollow annular housing 18 fabricated of an impermeable material, such as steel. The housing 18 includes a generally tubular or annular body portion 20 and two flange members 22 and 24 that extend generally radially inwardly from the tubular body portion. The flange 22 is annular in shape and is located at one end of the body portion 20 of the housing 18. The flange 22 is secured about its radially outer periphery to the body portion 20 of the housing 18 by a plurality of bolts 26. The shank of each bolt 26 passes through one of a plurality of circumferentially spaced apart bores 28 formed about the periphery of the flange 22. The threaded portion of the shank of each bolt 26 is then screwed into an aligned, threaded bore 30 formed axially into the body portion 20 of the housing 18. The head of each bolt 26 has a specially configured recess (not shown) that can be engaged by a tool such as an allen wrench to tighten the bolts 26 in the threaded bores 30. To ensure that a fluid-tight seal is provided between the flange 22 and the body portion 20 of the housing 18, two annular O-rings 32 and 34 encircle an axially extending portion of the flange 22. The O-rings 32 and 34 are received in parallel, annular grooves formed in the axially extending portion of the flange 22. Both rings 32 and 34 sealingly engage an adjacent surface of the body portion 20 of the housing 18. Because of its annular shape, the flange 22 defines an opening at one end of the housing 18 which is utilized for a purpose that will be explained hereinafter.

The other flange 24 of the housing 18 is formed in one piece with the tubular body portion 20 of the housing. The flange 24 is annular and is spaced from the flange 22 along the longitudinal axis 16 of the joint assembly 10 and the housing 18. Adjacent the interior circumferential surface of the flange 24, a short tubular extension 36 extends axially of the flange 24 and away from both flanges 22 and 24 to provide an attachment that engages the adjacent length of conduit 14. Together, the inner circumferential surface of the flange 24 and the tubular extension 36 define an opening at the end of the housing 18 opposite the flange 22.

Received within the housing 18 is one end of a short tubular member 38, which is fabricated of an impermeable material such as steel. The tubular member 38 projects through the opening in the housing 18 defined by the inner circumferential surface of the flange 22. The end of the tubular member 38 that is exposed through the opening in the flange 22 sealingly engages the adjacent end of the length of conduit 12. The end of the tubular member 38 that is within the housing 18 includes an annular flange 40 that extends radially outwardly from the main body portion 41 of the tubular member. The flange 40, which is formed in one piece with the body portion 41 of the tubular member 38, is thus located between the flanges 22 and 24 of the housing 18. The surface 42 of the flange 40 which is presented to the flange 24 of the housing 18 has an arcuate shape, when viewed in radial section, and mates with the correspondingly configured interior surface of the flange 24.

Located between the flange 22 of the housing 18 and the flange 40 of the tubular member 38 are two annular flexible elements 46 and 48. Each of the flexible elements 46 and 48 includes an annular body of elastomer and is mounted between two relatively massive, annular rigid end members or end plates. For the flexible element 46, one end member is the annular flange 22 of the housing 18. Opposite and spaced from the flange 22 is the other end member 50 for the flexible element 46. The end member 50 is preferably formed of metal. The mutually opposed surfaces of the flange 22 and the end member 50 have spherical contours defined by circular arcs with common centers or origins located at point 52. As can be seen, point 52 is located along the longitudinal axis 16 of the housing 18. Although the opposed surfaces of the flange 22 and end member 50 are defined by concentric circular arcs in the illustrated embodiment of the invention, the surfaces may also be defined by nonconcentric circular arcs, by noncircular arcs, or by noncircular and nonconcentric arcs. Between the opposed spherically shaped surfaces of the flange 22 and the end member 50 is a body of elastomer 54 that has mating spherically shaped end surfaces 53 and 55. The elastomeric body 54 is bonded to both the flange 22 and the end member 50 along its end surfaces 53 and 55, which also constitute end surfaces of the element 46. Incorporated within the elastomeric body 54 are a plurality of annular, spaced apart shims 56 formed of a material that is substantially nonextensible as compared to the elastomer. Viewed another way, the flexible element 46 interposed between the flange 22 and the end member 50 is formed of a plurality of alternating and bonded together layers of elastomeric material 54 and nonextensible material 56.

The nonextensible shims or laminations 56 are preferably formed of steel, while the body of elastomer or the elastomeric laminations are preferably formed of a nitrile rubber. The nitrile rubber has a high resistance to attack by petroleum products. Other inextensible and elastomeric materials may be substituted for the steel and nitrile rubber where appropriate. Alternate elastomeric materials include natural rubber and other synthetic rubbers, while alternate inextensible materials include other metals, fiberglass, reinforced plastics, and high strength fiber reinforced resin materials. Each of the shims 56 incorporated into the flexible element 46 has a spherical configuration or surfaces that are circular arcs when viewed in radial section. The spherical or circular contours or surfaces are generated by circular arcs that have the same origin as the arcs that generate end surfaces 53 and 55 of the flexible element 46 and the opposed surfaces of the flange 22 and the end member 50. The overall spherical shape of the flexible element 46 permits the element to function as a universal joint. Relative rotational motion between adjacent nonelastomeric members (i.e., the shims 56, the flange 22, and the end member 50) is accommodated by flexing or shearing of the elastomer or elastomeric laminations 54. As with the end surfaces 50 and 55, the arcuate surfaces of the shims 56 need not be spherical nor need they be concentric. It is sufficient that the arcuate surfaces of the shims 56 and the end surfaces 53 and 55 of the flexible element 46 all be of generally the same shape and have points about which they are generated located adjacent to one another.

The flexible element 48 is constructed in much the same manner as the flexible element 46. The flexible element 48 is disposed between two relatively massive, annular rigid end members, one of which is provided by the flange 40 of the tubular member 38. The other end member 58, which is preferably formed of metal, is spaced from the flange 40 and mates, along one surface, with a surface of the end member 50 opposite its spherically shaped surface. The mutually opposed surfaces of the flange 40 and the end member 58 have spherical contours defined by circular arcs generated about concentric origins or center points located at point 60. Between the opposed spherically shaped surfaces of the flange 40 and the end member 58 is a body of elastomer 62 that is one component of the flexible element 48. The elastomeric body 62 is bonded to the flange 40 and the end member 58 along end surfaces 61 and 63 of the body, which mate with the surfaces of the flange and the end member. Incorporated into the body of elastomer 62 is a series of annular, spaced apart shims 64 formed of a material that is substantially nonextensible as compared to the elastomer. The elastomer 62 and the shims 64 of the flexible element 48 may be formed of the same materials as the elastomer 54 and the shims 56 of the flexible element 46. As in the flexible element 46, the shims 64 of the flexible element 48 have spherical configurations or, when viewed in radial section, circular surfaces defined by circular arcs that are generated about origins coincident with the origins of the arcs that generate the spherical end surfaces 51 and 53 of the flexible element 48. Again, the arcs need not be circular or concentric, but should be generally similar and have adjacent points about which they are generated.

As indicated above, the end member 50 of the flexible element 46 and the end member 58 of the flexible element 48 are engageable with one another. An annular flange 66 that projects axially from the end member 58 fits into a groove formed in the end member 50 so as to prevent relative radial movement between the two end members. Two annular O-rings 68 and 70 are received in grooves formed in the mating surface of the end member 50 to provide a fluid-tight seal between the end member 50 and 58. When fitted together, the two end members 50 and 58 form a rigid and relatively massive ring or annulus.

When the various components of the joint assembly 10 are assembled as shown in FIG. 1, the flexible elements 46 and 48 and the end members 50 and 58 provide a fluid-tight seal between the housing 18 and the tubular member 38. The seal permits fluid to flow from one conduit length 12 to the other conduit length 14, or vice versa, through the joint assembly 10 without leakage to the exterior of the joint assembly. The seal formed by the flexible elements 46 and 48 will also be adequate to resist loads on their exposed side surfaces resulting from the difference that will probably exist between the pressure on the fluid inside the joint assembly 10 and the conduit lengths 12 and 14 and the pressure on the exterior of the joint assembly and conduits. In an oil or gas well or well drilling installation, the conduit lengths 12 and 14 will normally be maintained in tension throughout their lengths. This tension load, which is transmitted to the joint assembly 10, is carried by compression loading of the flexible elements 46 and 48 and the end members 50 and 58. Since a compression load on the flexible elements 46 and 48 will tend to deflect or compress the elastomer in the elements, the flange 40 of the tubular member 38 will tend to move slightly away from the flange 24 of the housing 18. Such axial movement between the flange 40 of the tubular member 38 and the flange 24 of the housing 18 will not interrupt the seal provided by the flexible elements 46 and 48 but will permit relative rotational movement between the flanges 40 and 24, as will be explained. The relative dimensions of the various components of the joint assembly 10 are preferably such that when the joint is assembled, the elastomer in the flexible elements 46 and 48 is preloaded and predeflected between the housing flange 22 and the flange 40 of the tubular member. If axially directed loads are applied to the conduit sections 12 and 14 in a manner that would tend to force the tubular member 38 into the housing 18, the engagement between the flange 40 of the tubular member and the flange 24 of the housing will prevent tension loads from being placed on the flexible elements 46 and 48. Such tension loads are particularly detrimental to the fatigue life of the elastomeric bodies 54 and 62 in the flexible elements 46 and 48.

Figure 2:
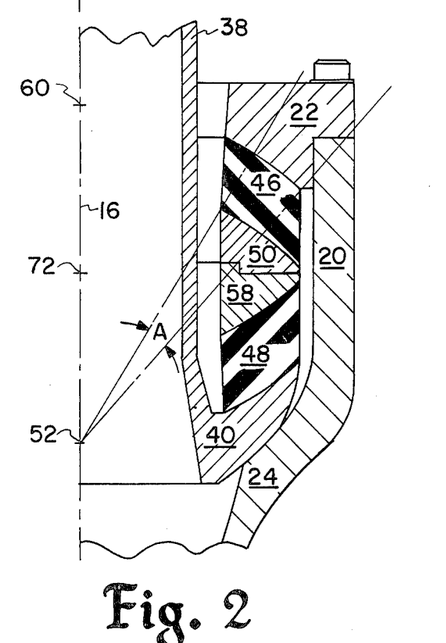
FIG. 2 is a schematic sectional view of the right-hand side of the flexible joint assembly of FIG. 1.
Figure 4:
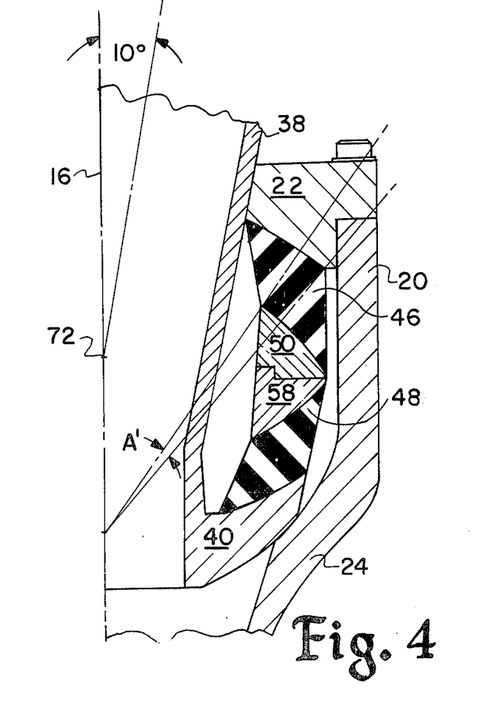
FIG. 4 is a schematic sectional view similar to FIG. 2, but showing the joint assembly of FIG. 2 in a deflected position.

The spherical configurations of the flexible elements 46 and 48 permit angular misalignments between the lengths of conduit 12 and 14 on either side of the joint assembly 10. Angled relative orientations of the lengths of conduit 12 and 14 are accommodated by relative rotational movements between nonelastomeric members such as shims 56 and 64 and by torsional shearing of the elastomer 54 and 62 in the flexible elements 46 and 48, respectively. The elastomer in the flexible elements 46 and 48 will also be strained in torsional shear to accommodate rotational movements of the conduit sections 12 and 14 about their longitudinal axes. The deflection of the flexible elements 46 and 48 that occurs when the adjacent lengths of conduit 12 and 14 pivot relative to each other about axes transverse to the longitudinal axis 16 of the joint assembly 10 can be illustrated through a comparison between FIGS. 2 and 4. The motion shown in FIGS. 2 and 4 of the drawings occurs about a point 72 located intermediate the centers of curvature 52 and 60 of the flexible elements 46 and 48, respectively. FIG. 2 shows, in schematic radial half section, the righthand side of the joint assembly 10 prior to deflection. FIG. 4 shows the joint assembly 10 with the conduit length 12 tilted at an angle of 10° with respect to the longitudinal axis 16 of the joint assembly and the conduit length 14. As indicated previously, approximately half of the tilting motion is accommodated by shearing deflection of the elastomer 54 in the flexible element 46, while the other half of the tilting movement is accommodated by shearing deflection of the elastomer 62 in the flexible element 48. Although it is not fully illustrated, the tubular member 38 is snubbed against or engaged with the housing 18 at two points to prevent overstressing of the elastomer at this predetermined maximum allowable tilting angle. The right-hand side of the tubular member 38 is in contact with the housing flange 22, as shown, while the left-hand side of the flange 40 of the tubular member is in contact with the body portion 20 of the housing 18.

Figure 3:
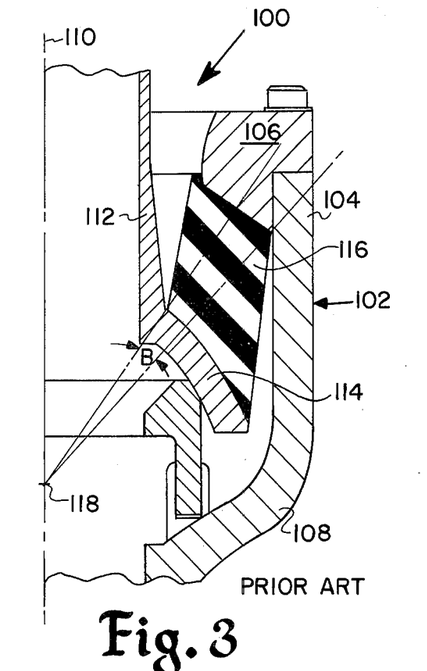
FIG. 3 is a schematic sectional view of the right-hand side of a prior art flexible joint assembly.
Figure 5:
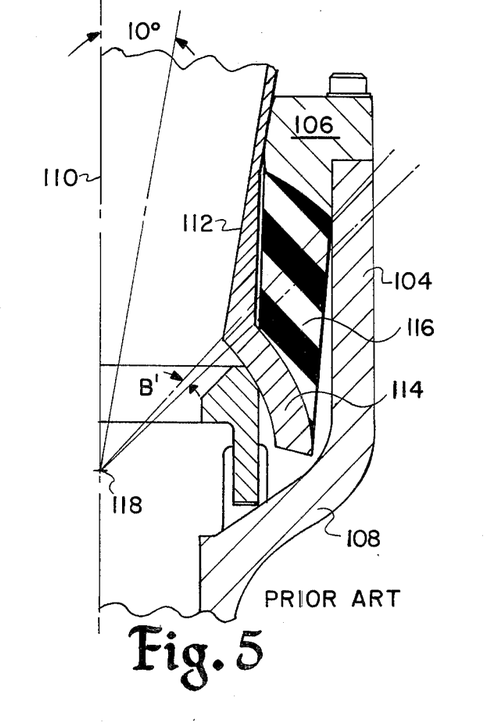
FIG. 5 is a schematic sectional view similar to FIG. 3, but showing the prior art flexible joint assembly in a deflected position.

The advantages of the joint assembly 10 shown in FIGS. 1, 2 and 4 of the drawings can best be appreciated by comparing the joint assembly 10 to a conventional joint assembly 100, as shown in FIGS. 3 and 5 of the drawings. The joint assembly 100 is substantially similar to the joint assembly illustrated at page 6 of the previously mentioned ASME paper 76-Pet-68. Like the joint assembly 10, the joint assembly 100 has a housing 102 that includes a tubular body portion 104 and two annular flanges 106 and 108. The flanges 106 and 108 are spaced apart along the longitudinal axis 110 of the joint assembly 100 and extend radially inwardly from the annular body portion 104 of the housing 102. Received within the housing 102 is one end of a tubular member 112. An annular flange 114 extends radially outwardly from the end of the tubular member 112 received within the housing 102 and is disposed between the flanges 106 and 108 of the housing. Sealingly engaged between the flange 106 of the housing 102 and the flange 114 of the tubular member 112 is an annular flexible element 116. The flexible element 116 is formed of a plurality of alternating and bonded together layers (not shown) of an elastomeric material and a material that is substantially inextensible as compared to the elastomeric material. The opposed surfaces of the flanges 106 and 114 and the major surfaces of the laminations or shims of nonextensible material within the flexible element 116 are all, when viewed in radial section, defined by circular arcs that have a common origin located at point 118 on the axis 110 of the joint assembly 100. As a result, the joint assembly 100 accommodates relative pivotal motion between adjacent conduit lengths by relative rotation of nonelastomeric components about point 118 and by straining in torsional shear the elastomer in the flexible element 116. The prior art joint assembly 100 is shown in its undeflected state in FIG. 3 of the drawings and in its deflected state in FIG. 5 of the drawings.

For purposes of the comparison that follows, it is to be assumed that the two flexible elements 46 and 48 of the joint assembly 10 together have the same thickness or height as the single flexible 116 of the joint assembly 100. The heights or thicknesses of the various flexible elements 46, 48 and 116 are measured along lines oriented normal to the spherical surfaces that are included in the flexible elements. The total number and thickness of the nonextensible shims 56 and 64 in the flexible elements 46 and 48 are assumed to be the same as the total number and thickness of shims in the flexible element 116. Thus, the total height or thickness of elastomer in the two flexible elements 46 and 48 will be identical to the total height or thickness of elastomer in the flexible element 116. It should also be assumed that each layer of elastomer in each of the flexible elements 46, 48 and 116 has the same thickness and the same shear modulus.

When the elastomer in the flexible element 116 is strained in shear to accommodate tilting movements, as shown in FIG. 5 of the drawings, the effective stiffness or resistance to deflection of each layer of elastomer in the flexible element 116 is dependent upon the square of the radial distance between the lamination and the center of rotation 118. If the layer of elastomer closest to the flange 106 of the housing 102 is twice as far from the center of rotation 118 as the layer of elastomer closest to the flange 114 of the tubular member 112, the outer layer of elastomer will appear to be about four times as stiff in response to pivotal motion of the tubular member 112 with respect to the housing 102 as will the layer of elastomer closest to the flange 114 of the tubular member (assuming equal thickness, shear modulus, and surface area for all layers). Because of the difference in apparent stiffnesses, the layer of elastomer closest to the flange 114 will be worked or strained approximately four times as much as the elastomer adjacent the flange 106 for any given angle of pivotal motion or any given maximum strain in the elastomer. Since the layer of elastomer closest to the flange 106 will be strained in shear only about one fourth as much as the layer of elastomer closest to the flange 114, its contribution to the total motion accommodation of the joint 100 is only about 25 percent that of the layer of elastomer closest to the flange 114 despite the equal thicknesses of the layers. Moreover, because of the differences between the radii of the arcs that define the major surfaces of successive elastomeric layers of the flexible element 116, the layers closer to the flange 106 probably have larger surface areas than the layers closer to the flange 114. The layers with the larger surface areas will have increased resistance to torsional motion and thus contribute even less to the total motion accommodation of the element 116 than the foregoing analysis would suggest.

The situation described immediately above is to be contrasted with the situation encountered in the joint assembly 10 of the present invention. Each flexible element 46 and 48 of the joint assembly 10 is only one-half the height or thickness of the flexible element 116. Considering the flexible element 46 as typical of both flexible elements, let us assume that the distance from the center of rotation 52 to the layer of elastomer closest to the end member 50 of the flexible element 46 is the same as the distance from the center of rotation 118 to the layer of elastomer closest to the flange 114 in the joint assembly 100. The distance from the center of rotation 52 to the layer of elastomer of the flexible element 46 closest to the flange 22 in the joint assembly 10 will be only $1\frac{1}{2}$ times the distance to the layer of elastomer closest to the end member 50. Consequently, the apparent stiffness of the layer of elastomer closest to the flange 22 will only be 2.25 times the apparent stiffness of the layer of elastomer closest to the end member 50 in response to tilting movements of the tubular member 38 with respect to the housing 18. Where the joint assembly 10 is designed to the same maximum strain in its elastomeric bodies as the joint assembly 100, the layer of elastomer closest to the flange 22 will be strained or worked approximately twice as much at maximum strain for the layer of elastomer closest to the end member 50 as will the layer of elastomer closest to the end flange 106 when the layer of elastomer closest to the flange 114 is strained to the maximum permissible. Although the elastomer in the flexible element 46, for example, is being worked or strained to the same extent as the radially innermost elastomeric portion of the flexible element 116, the elastomer in the flexible element 48 is being worked or strained to a considerably greater extent than the elastomer in the portion of the flexible element 116 which is radially outermost. Thus, the two flexible elements 46 and 48 of the joint assembly 10 can accommodate more or a greater angle of pivoting motion for a given maximum strain in any portion of the elastomer utilized in the flexible elements than can the flexible element 116 of the prior art joint assembly 100. Conversely, for a given maximum angle of pivoting motion, the joint assembly 10 can offer a lower maximum strain in the elastomer of its flexible elements than can the joint assembly 100. Even a relatively small reduction in maximum strain is important because at strains of about 25%, the ratio of the expected fatigue lives of two elastomeric elements is inversely proportional to the ratio of their maximum strains raised to the fifth power. Thus, a 20% reduction in maximum strain will result in a 205% increase in fatigue life.

The use of the two end members 50 and 58 in the joint assembly 10 to form a relatively massive, annular, rigid member that separates the bodies of elastomer 54 and 62 of the flexible elements 46 and 48 will provide additional support for the shims 56 and 64 that are embedded in the bodies of elastomer 54 and 62, as compared to the support provided for the shims of the flexible element 116. Because of the arcuate end surfaces of the flexible elements 46 and 48, compressive loads imposed on the elements are applied substantially normal to the end surfaces or, in other words, along lines drawn radially from the centers of rotation 52 and 60. Looking now at FIG. 2, and at flexible element 46 in particular, it can be seen that when a compressive load is applied through the flange 22 and the end member 50, the non-extensible laminations 56 in the element are fully supported by both the end member 50 and the flange 22 only in an area defined by the "cone angle" designated A. Outside of the cone angle A, the shims 56 are not fully supported. Thus, for example, looking at the lower right-hand section of the flexible element 46 as shown in FIG. 2, the portions of the nonextensible laminations 56 in this area of the flexible element 46 are not supported by the flange 22 against compressive loads applied by the end member 50. Instead, the edges of the shims are effectively cantilevered from the supported portions of the shims. Under a compressive load, the edges of the shims will tend to bend radially outwardly or upwardly away from the center of rotation 52. Such bending imposes detrimental loads and internal stresses on the shims 56, which may result in failure of the shims. The unsupported condition of the shim edges will be aggravated when pivotal motions are accommodated by the flexible element 46, as shown in FIG. 4. FIG. 4 illustrates that the cone angle A has diminished to a smaller angle A' and, consequently, the fully supported portions of the shims in the flexible element 46 have further diminished. Since a greater portion of each nonextensible shim or lamination 56 in the flexible element 46 is cantilevered out from the fully supported portion of the shim, greater stresses and loads are imposed on each shim.

Although the nonextensible laminations in the flexible elements 46 and 48 of the joint assembly 10 are not fully supported, the situation is more serious in the flexible element 116 of the joint assembly 100. As can be seen in FIG. 3, the fully supported portions of the nonextensible laminations (not shown) in the flexible element 116 are defined by the cone angle B. The cone angle B is already smaller than the angle A of FIG. 2, due in part to the height of element 116. When the flexible element 116 is flexed to accommodate pivotal movement between the tubular member 112 and the housing 102 to the same extent as shown in FIG. 4 (i.e., 10°), the cone angle B totally disappears and becomes, in fact, a negative angle B'. Thus, no portion of any nonextensible lamination in the flexible element 116 is fully supported. The tendency of the nonextensible laminations in the flexible element 116 to deflect under compressive loads is greatly increased, thereby substantially reducing the fatigue life of the shims, the flexible element 116, and the joint assembly 100. The effective cone angle in either joint assembly 10 or 100 can be increased by increasing the dimension of any flexible element 46, 48 or 116 along its radially outermost spherical surface or, stated another way, along the surfaces of the flanges 22, 40 and 106. The penalty for so increasing the surfaces in question is to increase the outer diameter of the housing 102 and, consequently, the size and weight of the joint assembly 10 or 100. Nonetheless, because each flexible element 46 or 48 of the joint assembly 10 must accommodate only half of the total pivotal motion to be accommodated by the joint, and because each flexible element 46 or 48 is only about half as tall or thick as the element 116, any given increase in effective cone angle can be achieved in the elements 46 and 48 by a smaller increase in their outermost spherical surfaces than in the element 116.

Although it might be possible to construct the two flexible elements 46 and 48 with their centers of rotation 52 and 60 both located at the center 72 of the joint assembly 10, the rigid annulus represented by the two end members 50 and 58 would have to be much larger in size. Any increase in the size of the rigid annulus would also increase the total length of the joint assembly 10.

A number of structural variations in the illustrated embodiment of the invention are possible without affecting the functioning of the joint assembly 10. Thus, for example, the shims 56 and 64 might have tapered thicknesses. The thicknesses and the shear moduli of successive layers of elastomer in each flexible element 46 or 48 could be varied in accordance with the teachings of Schmidt U.S. Pat. No. 3,679,197. Either of the flexible elements 46 or 48 might also be formed entirely of elastomer without any nonextensible laminations or shims 56 or 64. The ability to use nonlaminated flexible elements would depend upon the compressive loads applied on the elements due to tensioning of the conduits 12 and 14 and upon the fluid pressures exerted on the side surfaces of the elements. It would also be possible, and probably more convenient, to provide end members for the flexible elements 46 and 48 which are separate from the flanges 22 and 40. Although such a construction would require the addition of O-rings to seal the interfaces between such end members and the flanges 22 and 40, it would greatly facilitate the fabrication and molding of the flexible elements 46 and 48. At the same time, it would also be possible to form the two end members 50 and 58 as a single, one-piece annulus. Such an annulus would, however, make it more difficult to mold the flexible elements 46 and 48. The flange 22 might be attached to the body portion 20 of the housing 18 by mechanisms other than bolts, such as mating threads on the flange and the body portion.

As is suggested by the foregoing paragraph, the embodiment described above is merely exemplary and persons skilled in the art may make many variations and modifications without departing from the spirit and scope of the invention. All such modifications and variations are intended to be within the scope of the invention as defined in the appended claims.

What is claimed is:

1. In a joint assembly for interconnecting two conduits that receive fluid under a pressure different from an external ambient pressure on the conduits, said assembly comprising
    a hollow annular housing having an opening at each end and first and second annular flanges that extend radially inwardly relative to a maximum internal diameter of the housing, the two flanges being spaced apart along a longitudinal axis of the housing so that one end of the housing is closer to the first flange than to the second flange,
    a tubular member of smaller external diameter than said maximum internal diameter of the housing, the tubular member having adjacent one end an annular flange which extends radially outwardly of said member and which is disposed between the two flanges of the housing, the other end of the tubular member projecting through the opening at the one end of the housing for attachment to a fluid conduit,
    means defining a rigid annulus which encircles the tubular member within the housing and which is disposed between the first flange of the housing and the flange of the tubular member, and
    means defining two annular flexible elements, each flexible element including at least one body of elastomer and having a pair of annular exposed side surfaces, a first flexible element encircling the tubular member and being disposed between the first flange of the housing and the rigid annulus, the second flexible element also encircling the tubular member and being disposed between the rigid annulus and the flange of the tubular member, the two flexible elements and the rigid annulus defining at least part of a fluid-tight seal and load-bearing connection between the tubular member and the housing,
    the improvement wherein each flexible element has a pair of opposed annular end surfaces each of which extends generally from one side surface to the other side surface of the flexible element, each end surface when viewed in radial section being defined by an arc generated about a point located generally on the longitudinal axis of the housing, the end surfaces of the first flexible element when viewed in radial section being defined by first arcs which are generated about first points disposed relative to the first flexible element in a direction toward the other end of the housing, the end surfaces of the second flexible element when viewed in radial section being defined by second arcs which are generated about second points disposed relative to the second flexible element in a direction toward the one end of the housing, the second points being located closer to the one end of the housing than the first points.

2. A joint assembly, according to claim 1, wherein the body of elastomer of each flexible element is disposed between two rigid members and sealingly engages opposed surfaces of said members so as to define between said members annular exposed surfaces of the elastomeric body corresponding to the exposed side surfaces of the flexible element.

3. A joint assembly, according to claim 2, wherein one of the two rigid members engaged by each body of elastomer is the rigid annulus.

4. A joint assembly, according to claim 1, wherein each flexible element also includes a plurality of spaced annular shims of substantially inextensible material embedded in the body of elastomer of said element.

5. A joint assembly, according to claim 4, wherein each shim when viewed in radial section has surfaces defined by arcs generated about points located at least adjacent to the points about which are generated the arcs that define the end surfaces of the flexible element incorporating the body of elastomer in which the shim is embedded.

6. A joint assembly, according to claim 5, wherein the first and second arcs that define the end surfaces of the first and second flexible elements are circular arcs.

7. A joint assembly, according to claim 6, wherein the first arcs are both concentric, the second arcs are both concentric, and the arcs which define the arcuate surfaces of each shim are concentric with the arcs that define the end surfaces of the flexible element incorporating the body of elastomer in which the shim is embedded.

8. A joint assembly, according to claim 1, wherein the rigid annulus is formed in two sealingly engageable annular sections.

9. A joint assembly, according to claim 1, wherein the flange of the tubular member is dimensioned and located to be engageable with the second flange of the housing so that movement of the tubular member along the longitudinal axis of the housing toward the other end of the housing can be limited by said second flange.

* * * * *